United States Patent
Lee et al.

(10) Patent No.: US 9,456,419 B2
(45) Date of Patent: Sep. 27, 2016

(54) METHOD AND APPARATUS FOR APPLYING A DISCONTINUOUS RECEPTION (DRX) CYCLE IN A WIRELESS COMMUNICATION SYSTEM

(71) Applicant: LG ELECTRONICS INC., Seoul (KR)

(72) Inventors: Sunyoung Lee, Seoul (KR); Youngdae Lee, Seoul (KR); Sungjun Park, Seoul (KR); Seungjune Yi, Seoul (KR); Sunghoon Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/414,057

(22) PCT Filed: Jul. 12, 2013

(86) PCT No.: PCT/KR2013/006274
§ 371 (c)(1),
(2) Date: Jan. 9, 2015

(87) PCT Pub. No.: WO2014/010993
PCT Pub. Date: Jan. 16, 2014

(65) Prior Publication Data
US 2015/0181526 A1  Jun. 25, 2015

Related U.S. Application Data

(60) Provisional application No. 61/671,081, filed on Jul. 12, 2012.

(51) Int. Cl.
*H04W 52/02* (2009.01)
*H04W 76/04* (2009.01)

(52) U.S. Cl.
CPC ....... *H04W 52/0241* (2013.01); *H04W 76/048* (2013.01)

(58) Field of Classification Search
CPC ......... H04W 52/0216; H04W 76/048; H04W 16/10; H04W 52/0225; H04W 52/0209; Y02B 60/50
See application file for complete search history.

(56) References Cited

U.S. PATENT DOCUMENTS

2009/0232054 A1* 9/2009 Wang ................ H04W 52/0225
370/328
2009/0232118 A1* 9/2009 Wang ................... H04L 5/0091
370/338

(Continued)

FOREIGN PATENT DOCUMENTS

KR  10-2010-0052064 A   5/2010
KR  10-2010-0137507 A  12/2010

OTHER PUBLICATIONS

Sunplus Mmobile Inc., Further discussion on DRX Short Cycle Timer, R2-082582, 3GPP TSG-RANWG2 Meeting #62, Kansas City, USA, May 5-9, 2008 (http://www.3gpp.org/ftp/tsg_ran/WG2_RL2/TSGR2_62/Docs/).

*Primary Examiner* — Jung-Jen Liu
(74) *Attorney, Agent, or Firm* — Birch, Stewart, Kolasch & Birch, LLP

(57) ABSTRACT

A method for and apparatus for applying a DRX (Discontinuous Reception) cycle in a wireless communication system is provided. A wireless device configures one among a short DRX cycle and a long DRX cycle by a rule/an indicator predetermined right after DRX configuration by RRC signaling. Discontinuous reception (DRX) cycle can be configured rapidly and the DRX operation without receiving a DRX Command MAC CE and waiting for a drx-InactivityTimer is expired can be provided.

12 Claims, 6 Drawing Sheets

(56) References Cited

U.S. PATENT DOCUMENTS

2010/0118815 A1 5/2010 Kim et al.
2011/0002281 A1 1/2011 Terry et al.
2013/0084848 A1* 4/2013 Dalsgaard ......... H04W 52/0216
 455/422.1
2013/0294307 A1* 11/2013 Johansson ........... G10L 52/0209
 370/311

* cited by examiner

METHOD AND APPARATUS FOR APPLYING A DISCONTINUOUS RECEPTION (DRX) CYCLE IN A WIRELESS COMMUNICATION SYSTEM

CROSS REFERENCE TO RELATED APPLICATIONS

This application is the National Phase of PCT/KR2013/006274 filed on Jul. 12, 2013, which claims priority under 35 U.S.C. 119(e) to U.S. Provisional Application No. 61/671,081 filed on Jul. 12, 2012, all of which are hereby expressly incorporated by reference into the present application.

TECHNICAL FIELD

The present invention relates to wireless communications, and more particularly, to a method and apparatus for applying a DRX cycle in a wireless communication system.

BACKGROUND ART

3rd generation partnership project (3GPP) long term evolution (LTE) is an improved version of a universal mobile telecommunication system (UMTS) and a 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

Discontinuous reception (DRX) is a method for reducing battery consumption by allowing a user equipment (UE) to discontinuously monitor a downlink channel. When the DRX is configured, the UE discontinuously monitors the downlink channel. Otherwise, the UE continuously monitors the downlink channel.

Recently, many applications require an always-on characteristic. Always-on is a characteristic in which the UE is always connected to a network so as to directly transmit data whenever necessary.

However, since battery consumption is great when the UE continuously maintains the network connection, a proper DRX is configured in a corresponding application to guarantee the always-on characteristic while reducing battery consumption.

Recently, several various applications are running in parallel in one UE, and thus it is not easy to configure one DRX suitable for all of the applications. This is because, even if an optimal DRX is configured for a specific application, it may be a not proper DRX configuration with respect to other applications which are running in parallel.

There is a need for a method for operating the DRX in a more flexible manner.

DISCLOSURE OF INVENTION

Technical Problem

The present invention provides a method and apparatus for applying a DRX cycle right after DRX configuration in a wireless communication system.

The present invention also provides a method and apparatus for applying a DRX cycle with predetermined DRX cycle in a wireless communication system.

The present invention also provides a method and apparatus for applying a DRX cycle with a priority of a short DRX cycle in a wireless communication system.

The present invention also provides a method and apparatus for applying a DRX cycle with a priority of a long DRX cycle in a wireless communication system.

The present invention also provides a method and apparatus for applying a selective DRX cycle according to a priority indicator in a wireless communication system.

Solution to Problem

In an aspect, a method for applying a DRX (Discontinuous Reception) cycle in a wireless communication system is provided. The method includes receiving a RRC signaling with a DRX functionality, and using a short DRX cycle and starting a short DRX cycle timer if a Short DRX cycle is configured in the RRC signaling, wherein the RRC signaling is configured with both of the Short DRX Cycle and a Long DRX Cycle.

The method may further include calculating a starting subframe of a OnDurationTimer based on a drxStartOffset and the short DRX cycle at a subframe when the RRC signaling is received.

The method may further include performing a DRX operation with the Short DRX Cycle immediately, without receiving a DRX Command medium access control (MAC) control element (CE) or waiting for a drx-InactivityTimer is expired.

In another aspect, a wireless device for is applying a selective DRX (Discontinuous Reception) cycle in a wireless communication system provided. The wireless device includes a radio frequency unit for receiving a radio signal, and a processor, operatively coupled with the radio frequency unit, configured to receive a RRC signaling with a DRX functionality and use a short DRX cycle and start a short DRX cycle timer if a Short DRX cycle is configured in the RRC signaling, wherein the RRC signaling is configured with both of the Short DRX Cycle and a Long DRX Cycle.

Advantageous Effects of Invention

Discontinuous reception (DRX) cycle can be configured flexibly and a applying a DRX cycle with rule or an indicator predetermined between the UE and the eNB can be complied with accurately. More details, the UE do not expect change to a DRX cycle using a DRX Command MAC CE signalling or drx-InactivityTimer expires. It can be advantaged that a battery consumption of the UE can be reduced effectively by performing the DRX operation without receiving the DRX Command MAC CE to starts the DRX Cycle and waiting for the drx-InactivityTimer is expired.

MODE FOR THE INVENTION

Figure 1:
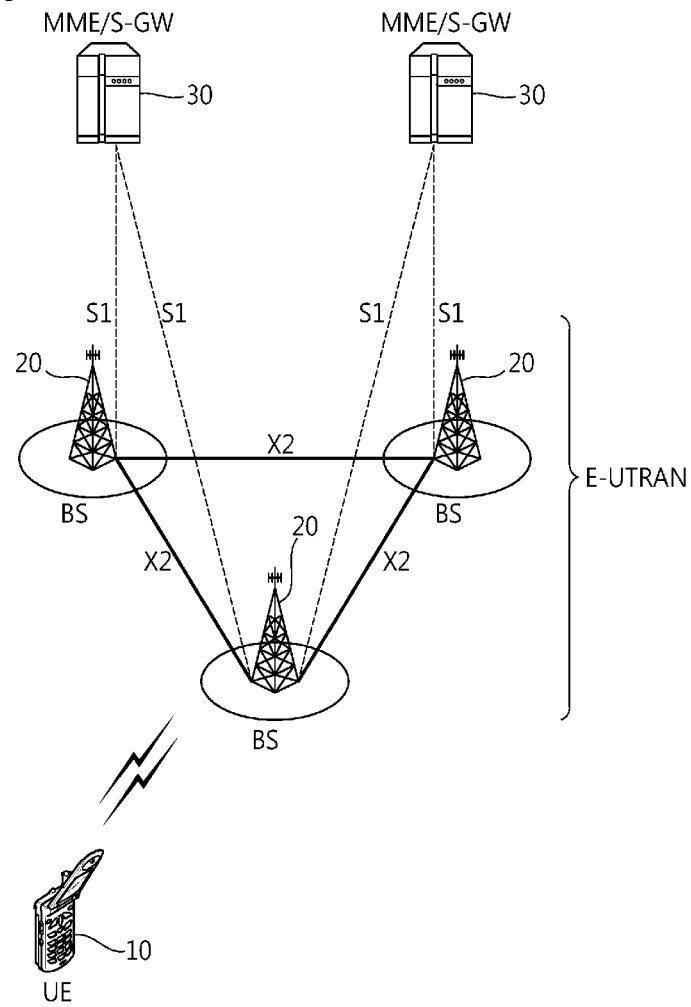
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
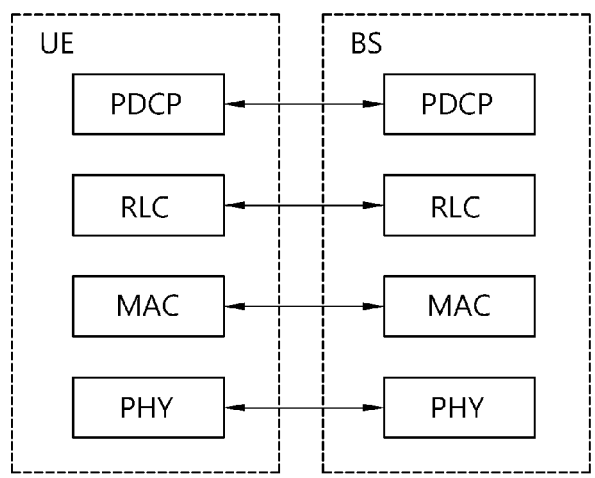
FIG. 2 is a diagram showing a radio protocol architecture for a user plane to which the present invention is applied.
Figure 3:
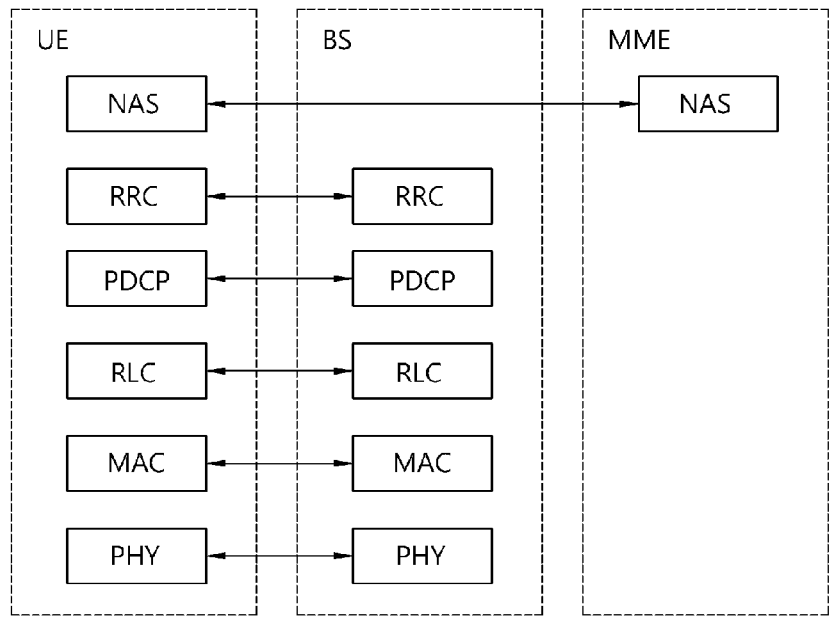
FIG. 3 is a diagram showing a radio protocol architecture for a control plane to which the present invention is applied to which the present invention is applied

FIG. 2 is a diagram showing a radio protocol architecture for a user plane. FIG. 3 is a diagram showing a radio protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Between different PHY layers, i.e., a PHY layer of a transmitter and a PHY layer of a receiver, data is transferred through the physical channel. The physical channel may be modulated using an orthogonal frequency division multiplexing (OFDM) scheme, and may utilize time and frequency as a radio resource.

Functions of the MAC layer include mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

Functions of the RLC layer include RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., the PHY layer) and the second layer (i.e., the MAC layer, the RLC layer, and the PDCP layer) for data delivery between the UE and the network.

The setup of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state (also may be referred to as an RRC connected mode), and otherwise the UE is in an RRC idle state (also may be referred to as an RRC idle mode).

Data is transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several subcarriers in a frequency domain. One subframe includes a plurality of OFDM symbols in the time domain. A resource block is a resource allocation unit, and includes a plurality of OFDM symbols and a plurality of subcarriers. Further, each subframe may use particular subcarriers of particular OFDM symbols (e.g., a first OFDM symbol) of a corresponding subframe for a physical downlink control channel (PDCCH), i.e., an L1/L2 control channel. A transmission time interval (TTI) is a unit time of subframe transmission.

The 3GPP LTE classifies a physical channel into a data channel, i.e., a physical downlink shared channel (PDSCH) and a physical uplink shared channel (PUSCH), and a control channel, i.e., a physical downlink control channel (PDCCH), a physical control format indicator channel (PC-FICH) and a physical hybrid-ARQ indicator channel (PH-ICH), and a physical uplink control channel (PUCCH).

The PCFICH transmitted in a 1st OFDM symbol of the subframe carries a control format indicator (CFI) regarding the number of OFDM symbols (i.e., a size of the control region) used for transmission of control channels in the subframe. The UE first receives the CFI on the PCFICH, and thereafter monitors the PDCCH.

The PDCCH is a downlink control channel, and is also called a scheduling channel in a sense that it carries scheduling information. Control information transmitted through the PDCCH is referred to as downlink control information (DCI). The DCI may include resource allocation of the PDSCH (this is referred to as a downlink (DL) grant), resource allocation of a PUSCH (this is referred to as an uplink (UL) grant), a set of transmit power control commands for individual UEs in any UE group and/or activation of a voice over Internet protocol (VoIP).

The wireless communication system as 3GPP LTE of the present invention uses blind decoding for PDCCH detection. The blind decoding is a scheme in which a desired identifier is de-masked from a CRC of a PDCCH (referred to as a candidate PDCCH) to determine whether the PDCCH is its own channel by performing CRC error checking.

A BS determines a PDCCH format according to DCI to be transmitted to a UE. Thereafter, the BS attaches a cyclic redundancy check (CRC) to the DCI, and masks a unique identifier (referred to as a radio network temporary identifier (RNTI)) to the CRC according to an owner or usage of the PDCCH.

Now, discontinuous reception (DRX) in a wireless communication system, as example, 3GPP LTE will be described.

The DRX is a method for reducing battery consumption of a UE by allowing the UE to discontinuously monitor a downlink channel.

Figure 4:
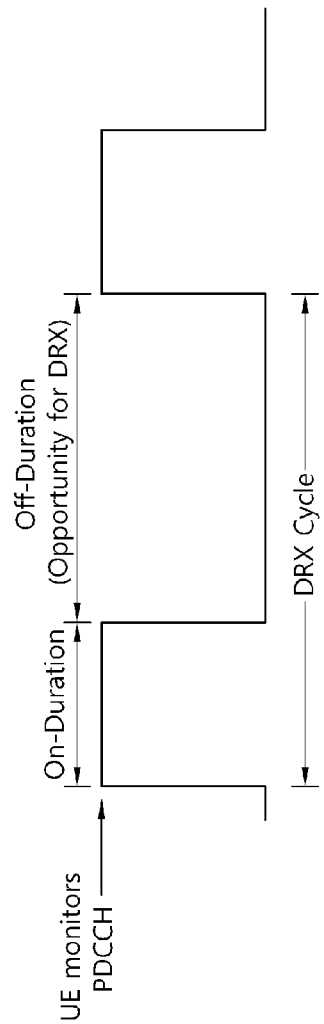
FIG. 4 shows a DRX cycle to which the present invention is applied

FIG. 4 shows a DRX cycle to which the present invention is applied.

A DRX cycle specifies the periodic repetition of the on-duration followed by a possible period of inactivity. The DRX cyclic includes an on-duration and an off-duration. The on-duration is a duration in which a UE monitors a PDCCH within the DRX cycle. The DRX cycle has two types, i.e., a long DRX cycle and a short DRX cycle. The long DRX cycle which has a long period can minimize battery consumption of the UE. The short DRX cyclic which has a short period can minimize a data transmission delay.

When the DRX is configured, the UE may monitor the PDCCH only in the on-duration and may not monitor the PDCCH in the off-duration.

An onDuration timer is used to define the on-duration. The on-duration can be defined as a duration in which the onDuration timer is running. The onDuration timer may specify the number of consecutive PDCCH-subframe(s) at the beginning of a DRX Cycle. The PDCCH-subframe specifies a subframe in which the PDCCH is monitored.

In addition to the DRX cycle, a duration in which the PDCCH is monitored can be further defined. A duration in which the PDCCH is monitored is collectively referred to as an active time.

A drx-Inactivity timer deactivates the DRX. If the drx-Inactivity timer is running, the UE continuously monitors the PDCCH irrespective of the DRX cycle. The drx-Inactivity timer starts upon receiving an initial UL grant or DL grant on the PDCCH. The drx-Inactivity timer may specify the number of consecutive PDCCH-subframe(s) after successfully decoding a PDCCH indicating an initial UL or DL user data transmission for this UE.

A HARQ RTT timer defines a minimum duration in which the UE expects HARQ retransmission. The HARQ RTT timer may specify the minimum amount of subframe(s) before a DL HARQ retransmission is expected by the UE.

A drx-Retransmission timer defines a duration in which the UE monitors the PDCCH while expecting DL retransmission. The drx-Retransmission timer may specify the maximum number of consecutive PDCCH-subframe(s) for as soon as a DL retransmission is expected by the UE. After initial DL transmission, the UE starts the HARQ RTT timer. When an error is detected for the initial DL transmission, the UE transmits NACK to a BS, stops the HARQ RTT timer, and runs the drx-Retransmission timer. The UE monitors the PDCCH for DL retransmission from the BS while the drx-Retransmission timer is running.

An Active Time can include an on-duration in which the PDCCH is periodically monitored and a duration in which the PDCCH is monitored due to an event occurrence.

When a DRX cycle is configured, the Active Time includes the time while:
  onDuration timer or drx-Inactivity timer or drx-Retransmission timer or mac-ContentionResolution timer is running; or
  a Scheduling Request is sent on PUCCH and is pending; or
  an uplink grant for a pending HARQ retransmission can occur and there is data in the corresponding HARQ buffer; or
  a PDCCH indicating a new transmission addressed to the C-RNTI of the UE has not been received after successful reception of a Random Access Response for the preamble not selected by the UE.

Figure 5:
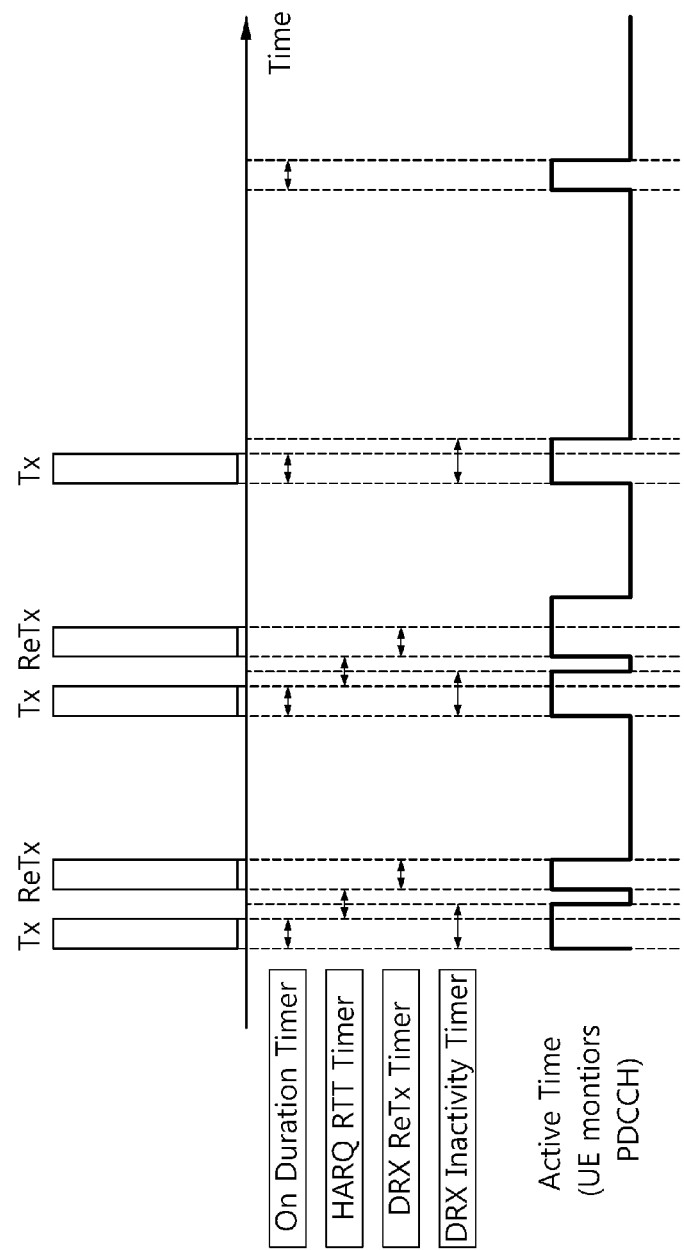
FIG. 5 shows active time for DRX operation to which the present invention is applied.

FIG. 5 shows active time for DRX operation to which the present invention is applied.

When DRX is configured, the UE shall for each subframe:
  if a HARQ RTT Timer expires in this subframe and the data of the corresponding HARQ process was not successfully decoded:
  start the drx-Retransmission timer for the corresponding HARQ process.
  if a DRX Command MAC CE (control element) is received:
  stop onDuration timer and drx-Inactivity timer.
  if drx-InactivityTimer expires or a DRX Command MAC CE is received in this subframe:

if the Short DRX cycle is configured:
start or restart drx-ShortCycle timer and use the Short DRX Cycle.
else:
use the Long DRX cycle.
if drx-ShortCycle timer expires in this subframe:
use the Long DRX cycle.
If the Short DRX Cycle is used and [(SFN*10)+subframe number] modulo (shortDRX-Cycle)=(drxStartOffset) modulo (shortDRX-Cycle); or
if the Long DRX Cycle is used and [(SFN*10)+subframe number] modulo (longDRX-Cycle)=drxStartOffset:
start onDuration timer.
during the Active Time, for a PDCCH-subframe, if the subframe is not required for uplink transmission for half-duplex FDD UE operation and if the subframe is not part of a configured measurement gap:
monitor the PDCCH;
if the PDCCH indicates a DL transmission or if a DL assignment has been configured for this subframe:
start the HARQ RTT timer for the corresponding HARQ process;
stop the drx-Retransmission timer for the corresponding HARQ process.
if the PDCCH indicates a new transmission (DL or UL):
start or restart drx-Inactivity timer.
when not in Active Time, type-0-triggered SRS shall not be reported.
if CQI masking (cqi-Mask) is setup by upper layers:
when onDurationTimer is not running, CQI/PMI/RI/PTI on PUCCH shall not be reported.
else:
when not in Active Time, CQI/PMI/RI/PTI on PUCCH shall not be reported.

As mentioned, the active-time is defined a total duration that the UE is awake. This includes the on-duration of the DRX cycle, the time UE is performing continuous reception while the inactivity timer has not expired and the time UE is performing continuous reception while waiting for a DL retransmission after one HARQ RTT. Based on the above the minimum active time is of length equal to on-duration, and the maximum is undefined (infinite).

Figure 6:
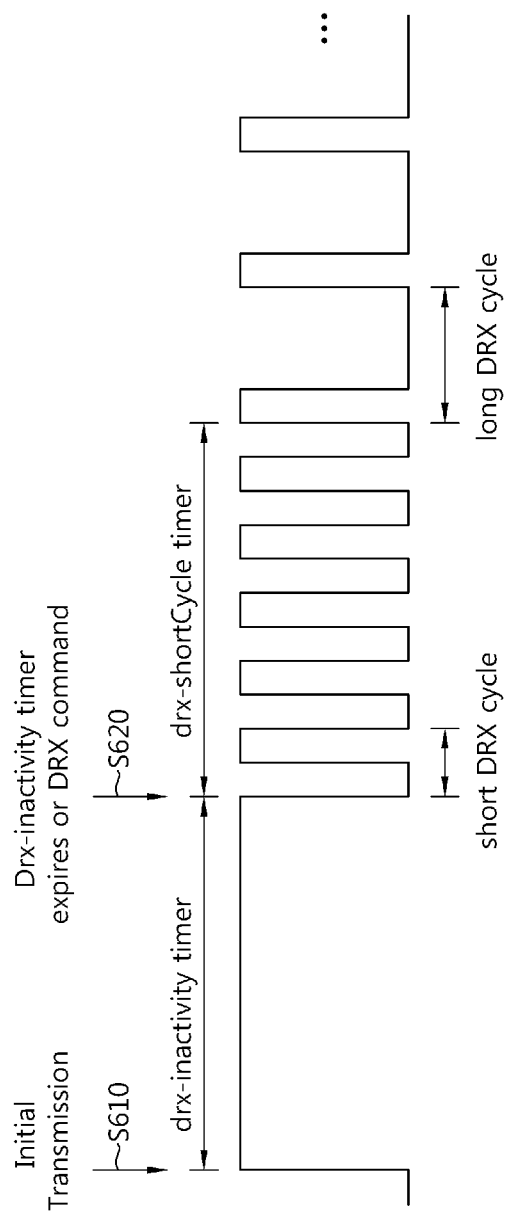
FIG. 6 shows an example of a transition of a DRX cycle to which the present invention is applied.

FIG. 6 shows an example of a transition of a DRX cycle to which the present invention is applied.

Upon receiving initial transmission from an eNB, a drx-Inactivity timer (also referred to as a first timer or an inactivity timer) starts (step S610). A UE continuously monitors a PDCCH while the drx-Inactivity timer is running.

If the drx-Inactivity timer expires or if a DRX command is received from the eNB, the UE transitions to a short DRX cycle (step S620). Then, the drx-shortCycle timer (also referred to as a second timer or a DRX cycle timer) starts.

The DRX command can be transmitted as a MAC CE, and can be called a DRX indicator that indicates a transition to the DRX. The DRX command MAC CE is identified through a long channel ID (LCID) of a MAC PDU subheader.

While the drx-shortCycle timer is running, the UE operates in the short DRX cycle. If the drx-shortCycle timer expires, the UE transitions to a long DRX cycle.

If the short DRX cyclic is pre-set, the UE transitions to the short DRX cycle. If the short DRX cyclic is not pre-set, the UE can transition to the long DRX cycle.

A value of HARQ RTT timer is fixed to 8 ms (or 8 subframes). Other timer values (i.e., an onDuration timer, a drx-Inactivity timer, a drx-Retransmission timer, a mac-ContentionResolution timer, etc.) can be determined by the eNB through an RRC message. The eNB can configure the long DRX cycle and the short DRX cycle through the RRC message.

As described FIG. 5 and FIG. 6, two types of DRX cycle provides to adaptively control the UE s PDCCH monitoring activity, a Short DRX Cycle and a Long DRX Cycle. When the DRX is configured to the UE by an RRC signaling, there can be an unavoidable delay or the signaling overhead in applying the DRX Cycle. For example, the UE starts using the short DRX Cycle for the DRX operation only when the drx-InactivityTimer expires or the DRX Command MAC control element is received by the UE. And the UE starts using the Long DRX Cycle for the DRX operation only when the shortDRXCycleTimer expires.

Corresponding to the above operation, the UE has to wait for ending the drx-InactivityTimer as delay to apply the Short DRX cycle after the UE received the DRX configuration for DRX operation via the RRC signalling. That causes that a performance of the UE power consumption for the DRX makes to reduce down and this DRX operation is not efficient enough. The UE also waits to receive to the DRX Command MAC CE to apply to DRX cycle newly, this operation also causes to signaling overhead, that is, these operations are not proper to perform the DRX.

More details, both cases are based on the assumption that the UE receives the PDCCH indicating a new transmission in DL or UL during the Active Time. For example of the first case, the drx-InactivityTimer starts when the UE receives the PDCCH indicating a new transmission in UL or DL during onDurationTimer is running. The problem is that the Active Time is started after the UE applies the DRX Cycle, but the first starting point of the DRX Cycle after DRX configuration is not specified in the current wireless system. In addition, sending the DRX Command MAC CE to starts the DRX Cycle incurs a signaling overhead.

For this invention, several solutions are proposed for the UE to use the DRX Cycle immediately upon receiving the DRX configuration by the RRC, and to adaptively apply the DRX Cycle among the Short DRX Cycle and the Long DRX Cycle. The applying the DRX Cycle adaptively includes a scheme to apply to a priority DRX cycle with predetermined. Also, this invention includes a scheme to apply to a DRX cycle with indication to indicate a specific DRX Cycle to use. Therefore, the present invention provides that UE applies a DRX cycle as soon as the UE receives an RRC signal forming a DRX configuration from the BS. The DRX cycle is limited to the Short DRX cycle or the Long DRX Cycle.

More details, the BS transmits an RRC signal for forming the DRX configuration to the UE. The RRC signal can include information on the configuration of DRX timers associated with the DRX operation, information on the configuration of the Long DRX Cycle, and information on the configuration of the Short DRX Cycle.

The UE, upon receiving the RRC signal including the above information from the BS, starts using one DRX cycle among the Short DRX Cycle and the Long DRX Cycle. In the above process, the UE can implicitly apply the Short DRX Cycle immediately upon receiving the RRC signal from the BS. The UE can also implicitly apply the Long DRX Cycle immediately upon receiving the RRC signal from the BS.

In the above process, the UE performs the following operations in the case where the terminal as the UE, upon receiving an RRC signal from the BS, implicitly applies the Short DRX Cycle.

If the UE is configured to use both the Short DRX Cycle and Long DRX Cycle,

√ the UE starts the drxShortCycleTimer.

√ the UE starts using a Short DRX Cycle. For example, the UE operates the onDurationTimer according to the configuration information on the Short DRX Cycle included in the RRC signal.

If the UE is configured to only use the Long DRX Cycle, the UE starts using a Long DRX Cycle. For example, the UE operates the onDurationTimer according to the configuration information on the Long DRX Cycle included in the RRC signal.

When the UE, upon receiving an RRC signal from the BS, implicitly applies a Long DRX Cycle in the above process, the UE starts using a Long DRX Cycle regardless of whether the UE has been configured to use a Short DRX Cycle or not.

Additionally, the UE, upon receiving an RRC signal from the base station in the above process, can apply a specific DRX Cycle configured by the BS.

For this operation, the RRC signal can include drxCycleLevel indicating what DRX cycle the UE should apply. In other words, the UE applies the DRX cycle indicated by the drxCycleLevel when received the RRC signal from the BS.

Figure 7:
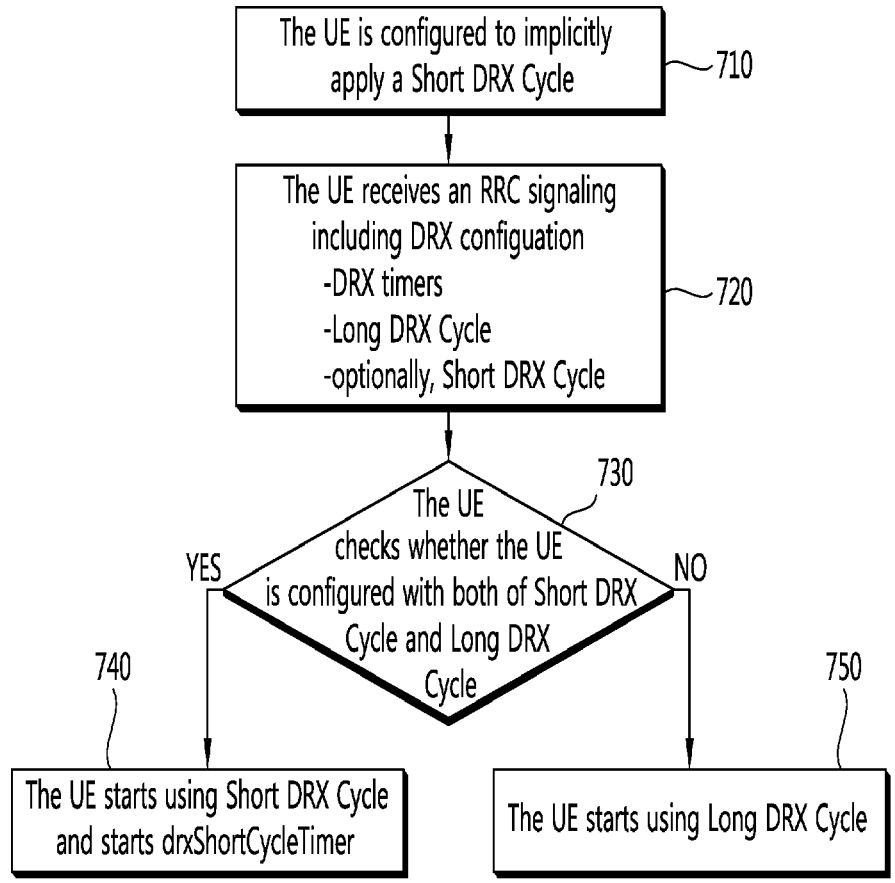
FIG. 7 shows an example of DRX operation by applying a Short DRX Cycle according to an exemplary embodiment of the present invention.
Figure 8:
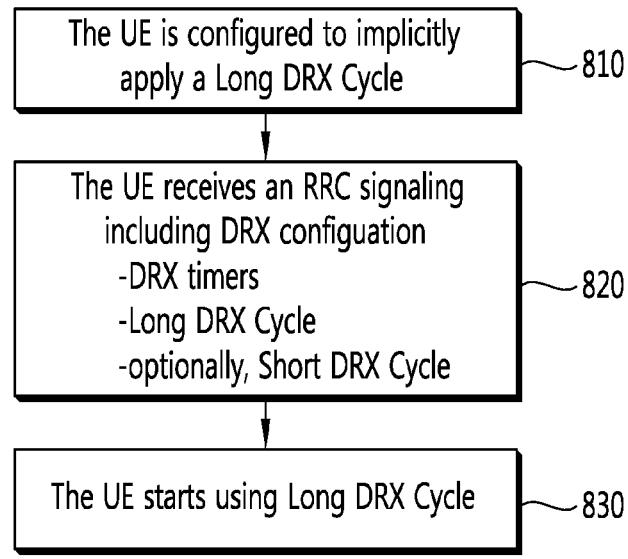
FIG. 8 shows an example of DRX operation by applying a Long DRX cycle according to an exemplary embodiment of the present invention.
Figure 9:
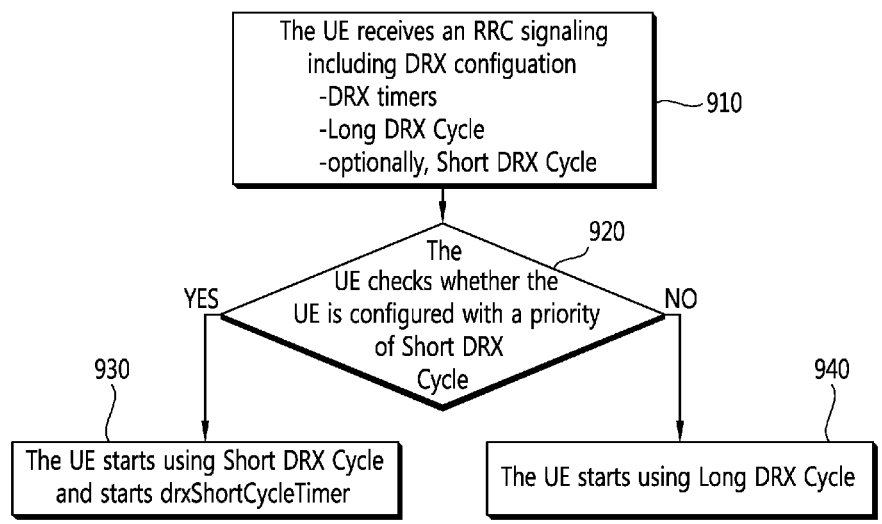
FIG. 9 shows an example of DRX operation by applying a DRX cycle using an indicator according to an exemplary embodiment of the present invention.

Following FIG. 7 to FIG. 9, a DRX operation of the UE is explained more details.

FIG. 7 shows an example of DRX operation by applying a Short DRX Cycle according to an exemplary embodiment of the present invention. For example, it shows an exemplary embodiment according to the present invention of implicitly applying to Short DRX cycle when the UE receives an RRC signal for DRX configuration from the BS.

Referring to FIG. 7, the UE has been configured to implicitly apply the Short DRX Cycle when the UE receives the RRC signal forming the information on the configuration of DRX from the BS (710).

The UE receives an RRC signal to configure a DRX configuration (720). The RRC signal can include information on the configuration of the DRX timers associated with the DRX operation, information on the configuration of the Long DRX Cycle, and information on the configuration of the Short DRX Cycle additionally. That is, the BS transmits the RRC signal for forming the DRX configuration to the UE.

The timers for the DRX functionality include onDurationTimer, drx-InactivityTimer, drx-RetransmissionTimer. Herein the value of each timer is defined as a certain number of consecutive PDCCH-subframe(s), and different each psf (PDCCH subframe) value is configured to corresponding to each timer. And Long DRX Cycle configuration information elements include the Long DRX Cycle, the value of the drxStartOffset. For the Long DRX Cycle StartOffset in a configured subframe is set with a integer predetermined among 0 to N (larger than 0). Optionally, the Short DRX Cycle configuration information elements include the drxShortCycleTimer and Short DRX Cycle. The Short DRX Cycle is defined with a configured subframe, the drxShortCycleTimer is set with a integer from 0 to 16.

The UE checks whether the UE is configured to use both the Short DRX Cycle and Long DRX Cycle for the DRX configuration by receiving the RRC signal (730). If the UE is configured with both the Long DRX Cycle and the Short DRX Cycle (730, Yes), the UE starts using the Short DRX Cycle. The UE starts onDurationTimer at the configured subframe for the configured time to monitor the PDCCH. The UE calculates the starting subframe of onDurationTimer based on drxStartOffset and Short DRX Cycle. The UE starts the drxShortCycleTimer (740).

Else if the UE is configured with the Long DRX Cycle without the Short DRX Cycle (730, No), The UE starts using the Long DRX Cycle. The UE starts onDurationTimer at the configured subframe for the configured time to monitor the PDCCH. The UE calculates the starting subframe of onDurationTimer based on drxStartOffset and Long DRX Cycle (750).

Therefore, the UE uses the DRX Cycle immediately as soon as receiving the DRX configuration by the RRC, and to adaptively apply the DRX Cycle predetermined among the Short DRX Cycle and the Long DRX Cycle. This invention applies the DRX Cycle by receiving the DRX configuration by the RRC without an additional delay or signaling overhead of transition of DRX cycle.

FIG. 8 shows an example of DRX operation by applying a Long DRX cycle according to an exemplary embodiment of the present invention. For example, it shows an exemplary embodiment according to the present invention of implicitly applying a Long DRX cycle when the UE receives an RRC signal for DRX configuration from the BS.

Referring to FIG. 8, the UE has been configured to implicitly apply the Long DRX Cycle when the UE receives the RRC signal forming the information on the configuration of DRX from the BS (810).

The UE receives an RRC signaling to configure a DRX configuration (820). The RRC signaling includes timers for DRX operation including a onDurationTimer, a drx-InactivityTimer and a drx-RetransmissionTimer, Long DRX Cycle configuration information with the Long DRX Cycle and the value of the drxStartOffset, and optional short DRX Cycle configuration information with the drxShortCycleTimer and Short DRX Cycle.

When the UE receives the RRC signalling, the UE starts using the Long DRX Cycle directly (830). The use of the Long DRX Cycle includes DRX operation of UE if the UE is configured with the Long DRX Cycle, regardless of being configured with the Short DRX Cycle or not. So the UE starts onDurationTimer at the configured subframe for the configured time to monitor the PDCCH. The UE calculates the starting subframe of onDurationTimer based on drxStartOffset and Long DRX Cycle.

The present invention proposes that the UE can apply the DRX cycle without signalling overhead and delay after receiving an RRC signal configuring the operation of the DRX, thereby providing the effect of reducing power consumption of the UE.

FIG. 9 shows an example of DRX operation by applying a DRX cycle using an indicator according to an exemplary embodiment of the present invention. The UE receives an RRC signaling with a flag bit, which explicitly indicates DRX Cycle to be used by the UE.

Referring FIG. 9, when the UE is configured the DRX functionality from the eNB by receiving an RRC signaling (910). The RRC signaling includes the timers of a onDurationTimer, a drx-InactivityTimer, and a drx-RetransmissionTimer, long DRX Cycle configuration information with the longDRX-Cycle and the value of the drxStartOffset, and optional short DRX Cycle configuration information with the drxShortCycleTimer and shortDRX-Cycle. The UE is configured with both of the Short DRX Cycle and the Long DRX Cycle by receiving the RRC signalling that configures the DRX functionality to UE.

When the UE receives the RRC signaling, the UE checks that it is configured with a priority of the Short DRX Cycle over the Long DRX Cycle (920).

If the UE is configured with a priority of the Short DRX Cycle over the Long DRX Cycle (920, Yes), the UE starts using the Short DRX Cycle. The UE starts onDurationTimer at the configured subframe for the configured time to monitor the PDCCH. The UE calculates the starting subframe of onDurationTimer based on drxStartOffset and Short DRX Cycle. The UE starts the drxShortCycleTimer.

Whereas, if the UE is configured with a priority of the Long DRX Cycle over the Short DRX Cycle (930, No), The UE starts using the Long DRX Cycle. The UE starts onDurationTimer at the configured subframe for the configured time to monitor the PDCCH. The UE calculates the starting subframe of onDurationTimer based on drxStartOffset and Long DRX Cycle.

Herein, the proposed invention includes that a drxCycleLevel is used as an indicator of the priority. For example, The UE receives an RRC signaling with a flag bit for the drxCycleLevel, which explicitly indicates DRX Cycle to be used by the UE and The UE determines whether the flag bit of the drxCycleLevel is set for the Short DRX Cycle, or the Long DRX Cycle.

If the drxCycleLevel indicates the Short DRX Cycle (930), the UE starts using the Short DRX Cycle. The UE starts onDurationTimer at the configured subframe for the configured time to monitor the PDCCH. The UE calculates the starting subframe of onDurationTimer based on drxStartOffset and the Short DRX Cycle. the UE starts the drxShortCycleTimer. Else if the drxCycleLevel indicates the Long DRX Cycle (940), the UE starts using the Long DRX Cycle. The UE starts onDurationTimer at the configured subframe for the configured time to monitor the PDCCH. The UE calculates the starting subframe of onDurationTimer based on drxStartOffset and Long DRX Cycle.

Therefore, the proposed invention includes for the UE to use the DRX Cycle immediately upon receiving the DRX configuration by the RRC, and to adaptively apply the DRX Cycle among the Short DRX Cycle and the Long DRX Cycle. This invention provides the efficient DRX operation without an additional delay or signaling overhead.

Although the aforementioned embodiment shows the DRX operation of the UE for example, the proposed invention is applicable to a DRX operation of a machine to machine (M2M) device or a machine-type communication (MTC) device. MTC is one type of data communication including one or more entities not requiring human interactions. That is, the MTC refers to the concept of communication performed by a machine device, not a terminal used by a human user, by using the existing wireless communication network. The machine device used in the MTC can be called an MTC device. There are various MTC devices such as a vending machine, a machine of measuring a water level at a dam, etc.

Figure 10:
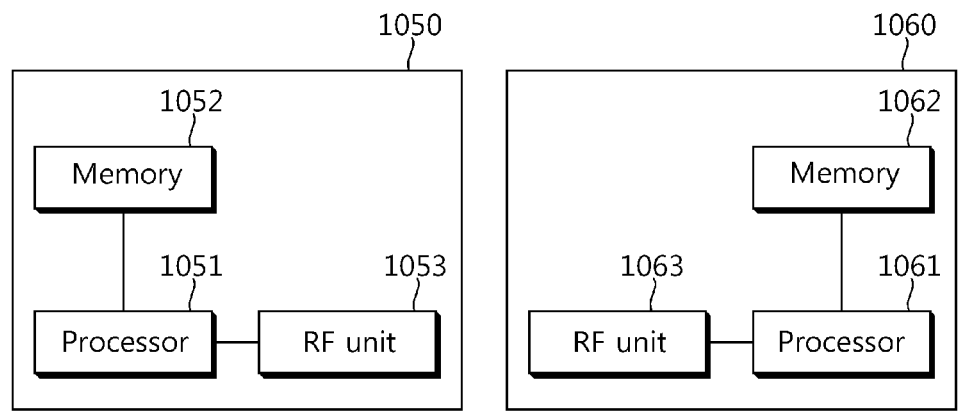
FIG. 10 shows a block diagram showing a wireless communication system according to an exemplary embodiment of the present invention.

FIG. 10 is a block diagram showing a wireless communication system according to an embodiment of the present invention.

A BS 1050 includes a processor 1051, a memory 1052, and a radio frequency (RF) unit 1053. The memory 1052 is coupled to the processor 1051, and stores a variety of information for driving the processor 1051. The RF unit 1053 is coupled to the processor 51, and transmits and/or receives a radio signal. The processor 1051 implements the proposed functions, procedures, and/or methods. In the embodiments of FIG. 8 to FIG. 10, the operation of the BS can be implemented by the processor 1051.

Especially, the processor 1051 configures and sets the DRX configuration and CSI transmission configuration with CQI masking on the UE. Herein, the DRX configuration is included to set to UE with both the Short DRX cycle and the Long DRX cycle. This processor 1051 controls the CSI transmission configuration to UE in order to correctly perform the CSI report at a specific subframe during On Duration configured for the CSI transmission with CQI masking under the DRX operation.

More details, the processor 1051 configures the DRX operation applied with the short DRX Cycle immediately when the RRC signal including the Short DRX cycle is signaled to the UE and the CSI report is received under the DRX operation applying the Short DRX Cycle. Or the processor 1051 configures the DRX operation applied with the Long DRX Cycle immediately when the RRC signal is signaled to the UE and the CSI report is received under the DRX operation with the Long DRX Cycle. The processor 1051 can also signal the RRC including a drxCycleLevel to indicate what DRX cycle to the UE to be applied and the CSI report is received under the DRX operation applying the DRX cycle based on the drxCycleLevel. Herein, the drxCycleLevel can be included to send to the UE via a MAC signalling.

Therefore, the processor 1051 controls to perform a DRX operation to apply the predetermined or the indicated DRX Cycle to be used, and the CSI report from the UE receives at a specific subframe during On Duration with the used DRX cycle. That is, the processor 1051 controls for the UE to adaptively apply the DRX Cycle among the Short DRX Cycle and the Long DRX Cycle, and the CSI reports with applying the Short DRX Cycle or the Long DRX Cycle with predetermined a priority DRX cycle. Also, the processor 1051 includes to controls to apply to a DRX cycle to be used with an indication as the flag bit, which explicitly indicates DRX Cycle to be used by the UE.

A wireless device 1060 includes a processor 1061, a memory 1062, and an RF unit 1063. The memory 1062 is coupled to the processor 1061, and stores a variety of information for driving the processor 1061. The RF unit 1063 is coupled to the processor 1061, and transmits and/or receives a radio signal. The processor 1061 implements the proposed functions, procedures, and/or methods. In the embodiments of the FIG. 8 to FIG. 10, the operation of the UE can be implemented by the processor 1061.

Especially, the processor 1061 configures and sets the DRX configuration and CSI transmission configuration with checking the RRC signal received by the RF unit 1063. Herein, the DRX configuration is included to set to UE with both the Short DRX cycle and the Long DRX cycle. Or the DRX configuration is also included to set to UE with only the Long DRX cycle without the Short DRX cycle. This invention also includes that the RRC with both the Short DRX cycle and the Long DRX cycle for the UE is configured to an indication to indicate a specific DRX Cycle to use or a predetermined priority to be applied first. The indication can be with a flag bit, which explicitly indicates DRX Cycle to be used by the UE Therefore, the processor 1061 controls to use the Short DRX Cycle immediately as soon as receiving the DRX configuration via the RRC, or to adaptively apply the Long DRX Cycle immediately even through the RRC is configured with the Long DRX Cycle and also the Short DRX Cycle, that is, as ignoring the Short DRX cycle. The processor 1061 also controls to use the DRX cycle immediately which the UE should apply firstly with the indication by the drxCycleLevel. Herein, the indication indicating a specific DRX Cycle to use with a priority is set the drxCycleLevel as the flag bit or an on/off type to reflect to both the Short DRX cycle and the Long DRX cycle each. The indication can be determined by receiving the RRC signal with the DRX and/or the CSI configurations or receiving a MAC signal for the indication additionally.

The processor 1061 controls to perform the CSI report at a specific subframe during On Duration configured with the CQI masking under the DRX operation after the processor 1061 used the DRX operation with one of the above DRX cycles applied.

Therefore, the processor 1061 controls the DRX Cycle to be used for the DRX operation immediately upon receiving the RRC signaling, and to adaptively apply the DRX Cycle among the Short DRX Cycle, the Long DRX Cycle, and indicated DRX Cycle with priority not to check if drx-InactivityTimer expires or a DRX Command MAC control element is received in this subframe. The processor 1061 controls to apply the DRX operation with new DRX cycle for the UE, without receiving the DRX Command MAC CE from the eNB to starts the DRX Cycle and waiting for the drx-InactivityTimer in used is expired. That is, the proposed invention has advantages that the UE uses the DRX Cycle immediately upon receiving the DRX configuration by the RRC, and to adaptively applies the DRX Cycle among the Short DRX Cycle and the Long DRX Cycle. These are for the efficient DRX operation without an additional delay or signaling overhead.

The technical concept of the present invention is based on provisional documents as described in the below.

<Start of Priority Document>

In this invention, four methods are proposed for the UE to use the DRX Cycle immediately upon receiving the DRX configuration by the RRC, and to adaptively apply the DRX Cycle among the Short DRX Cycle and the Long DRX Cycle.

Invention 1: The UE Implicitly Applies the Short DRX Cycle

When the eNB configures the DRX functionality to the UE, the eNB sends an RRC signalling, including
 the timers onDurationTimer, drx-InactivityTimer, drx-RetransmissionTimer.
 the longDRX-Cycle, the value of the drxStartOffset.
 optionally, the drxShortCycleTimer and shortDRX-Cycle.
When the UE receives the RRC signalling
 If the UE is configured with both of the Short DRX Cycle and the Long DRX Cycle,
 The UE starts using the Short DRX Cycle.
 The UE starts onDurationTimer at the configured subframe for the configured time to monitor the PDCCH. The UE calculates the starting subframe of onDurationTimer based on drxStartOffset and shortDRX-cycle.
 The UE starts the drxShortCycleTimer.
 Else if the UE is configured with the Long DRX Cycle without the Short DRX Cycle,
 The UE starts using the Long DRX Cycle.
 The UE starts onDurationTimer at the configured subframe for the configured time to monitor the PDCCH. The UE calculates the starting subframe of onDurationTimer based on drxStartOffset and longDRX-cycle.

Invention 2: The UE Implicitly Applies the Long DRX Cycle

When the eNB configures the DRX functionality to the UE, the eNB sends an RRC signalling, including
 the timers onDurationTimer, drx-InactivityTimer, drx-RetransmissionTimer.
 the longDRX-Cycle, the value of the drxStartOffset.
 optionally, the drxShortCycleTimer and shortDRX-Cycle.
When the UE receives the RRC signalling
 If the UE is configured with the Long DRX Cycle, regardless of being configured with the Short DRX Cycle or not,
 The UE starts using the Long DRX Cycle.
 The UE starts onDurationTimer at the configured subframe for the configured time to monitor the PDCCH. The UE calculates the starting subframe of onDurationTimer based on drxStartOffset and longDRX Cycle.

Invention 3: The UE Receives an RRC Signalling with a Flag Bit, which Explicitly Indicates DRX Cycle to be Used by the UE.

When the eNB configures the DRX functionality to the UE, the eNB sends an RRC signalling, including
 the timers onDurationTimer, drx-InactivityTimer, drx-RetransmissionTimer.
 the longDRX-Cycle, the value of the drxStartOffset.
 optionally, the drxShortCycleTimer and shortDRX-Cycle.
 optionally, the level of DRX Cycle to be used by the UE (drxCycleLevel).
When the UE receives the RRC signalling that configures the DRX functionality to the UE, and
When the UE is configured with both of the Short DRX Cycle and the Long DRX Cycle,
 If drxCycleLevel indicates the Short DRX Cycle,
 The UE starts using the Short DRX Cycle.
 The UE starts onDurationTimer at the configured subframe for the configured time to monitor the PDCCH. The UE calculates the starting subframe of onDurationTimer based on drxStartOffset and shortDRX-cycle.
 The UE starts the drxShortCycleTimer.
 Else if drxCycleLevel indicates the Long DRX Cycle,
 The UE starts using the Long DRX Cycle.
 The UE starts onDurationTimer at the configured subframe for the configured time to monitor the PDCCH. The UE calculates the starting subframe of onDurationTimer based on drxStartOffset and longDRX-cycle.

<End of Priority Document>

The processor may include application-specific integrated circuit (ASIC), other chipset, logic circuit and/or data processing device. The memory may include read-only memory (ROM), random access memory (RAM), flash memory, memory card, storage medium and/or other storage device. The RF unit may include baseband circuitry to process radio frequency signals. When the embodiments are implemented in software, the techniques described herein can be implemented with modules (e.g., procedures, functions, and so on) that perform the functions described herein. The modules can be stored in memory and executed by processor. The memory can be implemented within the processor or external to the processor in which case those can be communicatively coupled to the processor via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

The invention claimed is:

1. A method for applying a DRX (Discontinuous Reception) cycle in a wireless communication system, performed by a wireless device, the method comprising:
    receiving a Radio Resource Control (RRC) signaling with a DRX functionality;
    performing a short DRX operation using a short DRX cycle and starting a first timer for the short DRX operation if the RRC signaling is configured with both the short DRX cycle and a long DRX cycle; and
    starting a second timer for monitoring a physical downlink control channel (PDCCH),
    wherein the second timer is started at a specific subframe that is calculated based on a DRX start offset value and the short DRX cycle.

2. The method of claim 1, wherein the short DRX operation is performed immediately without receiving a DRX command medium access control (MAC) control element (CE) or waiting for a drx-InactivityTimer to expire.

3. The method of claim 1, wherein a long DRX operation is performed using the long DRX cycle if the RRC signaling is configured with both the short DRX cycle and the long DRX cycle.

4. The method of claim 3, wherein if the long DRX operation is performed, the second timer is started at a specific subframe that is calculated based on the DRX start offset value and the long DRX cycle.

5. The method of claim 1, wherein the RRC signaling is further configured with an indicator.

6. The method of claim 5, wherein the indicator includes a flag bit of a drxCycleLevel which indicates a DRX cycle to be used among the short DRX Cycle and the long DRX Cycle.

7. A wireless device for applying a selective DRX (Discontinuous Reception) cycle in a wireless communication system, the wireless device comprising:
    a radio frequency unit configured to receive a radio signal; and
    a processor, operatively coupled with the radio frequency unit,
    wherein the processor is configured to:
    receive a Radio Resource Control (RRC) signaling with a DRX functionality;
    perform a short DRX operation using a short DRX cycle and start a first timer for the short DRX operation if the RRC signaling is configured with both the short DRX cycle and a long DRX Cycle; and
    start a second timer for monitoring a physical downlink control channel (PDCCH),
    wherein the second timer is started at a specific subframe that is calculated based on a DRX start offset value and the short DRX cycle.

8. The wireless device of claim 7, wherein the short DRX operation is performed immediately without receiving a DRX command medium access control (MAC) control element (CE) or waiting for a drx-InactivityTimer to expire.

9. The wireless device of claim 7, wherein a long DRX operation is performed using the long DRX cycle if the RRC signaling is configured with both the short DRX cycle and the long DRX cycle.

10. The wireless device of claim 9, wherein if the long DRX operation is performed, the second timer is started at a specific subframe that is calculated based on the DRX start offset value and the long DRX cycle.

11. The wireless device of claim 7, wherein the RRC signaling is further configured with an indicator.

12. The wireless device of claim 11, wherein the indicator includes a flag bit of a drxCycleLevel which indicates a DRX cycle to be used among the short DRX cycle and the long DRX cycle as the indicator.

* * * * *